United States Patent
Nishiyama et al.

(10) Patent No.: US 6,846,590 B2
(45) Date of Patent: Jan. 25, 2005

(54) FUEL CELL STACK HAVING GROMMET WHICH COVERS EACH EDGE OF COMMUNICATING PASSAGES FORMED IN TERMINAL PLATE

(75) Inventors: Tadashi Nishiyama, Wako (JP); Toshiya Wakahoi, Wako (JP); Seiji Sugiura, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 418 days.

(21) Appl. No.: 10/042,063

(22) Filed: Oct. 18, 2001

(65) Prior Publication Data

US 2002/0058177 A1 May 16, 2002

(30) Foreign Application Priority Data

Oct. 19, 2000 (JP) .................................. P2000-319496

(51) Int. Cl.[7] .............................................. H01M 2/08
(52) U.S. Cl. ......................................... 429/35; 429/38
(58) Field of Search ............................. 429/18, 30, 35, 429/38

(56) References Cited

U.S. PATENT DOCUMENTS

| | | | |
|---|---|---|---|
| 4,312,735 A | 1/1982 | Grimes et al. | 204/228 |
| 4,371,433 A | 2/1983 | Balko et al. | 204/228 |
| 4,533,455 A | 8/1985 | Balko et al. | 204/279 |
| 5,342,706 A * | 8/1994 | Marianowski et al. | 429/35 |
| 6,426,159 B1 * | 7/2002 | Kralick | 429/34 |
| 6,444,346 B1 * | 9/2002 | Ohara et al. | 429/36 |
| 6,638,656 B2 * | 10/2003 | Bruckner et al. | 429/30 |

FOREIGN PATENT DOCUMENTS

| | | |
|---|---|---|
| JP | 09-063627 | 3/1997 |
| JP | 2000-164238 | 6/2000 |

* cited by examiner

*Primary Examiner*—Patrick Ryan
*Assistant Examiner*—Tracy Dove
(74) *Attorney, Agent, or Firm*—Lahive & Cockfield, LLP; Anthony A Laurentano, Esq.

(57) ABSTRACT

A fuel cell stack is disclosed, so as to prevent the corrosion of the power output terminal plate due to coolant and the occurrence of electric short circuits through the coolant, and to improve the flexibility of selection of the coolant. The fuel cell stack has unit fuel cells, each comprising an anode, a cathode, and an electrolyte which is placed between the anode and the cathode, wherein the unit fuel cells are stacked via separators. A pair of power output terminal plates are provided, one attached to each end face of the stacked unit fuel cells. A coolant supply and drainage passage and a gas supply and exhaust passage are formed through the stacked unit fuel cells and the power output terminal plates in the stacking direction, and the edge of each passage through the power output terminal plates is covered with a grommet having an insulating capability.

5 Claims, 7 Drawing Sheets

FUEL CELL STACK HAVING GROMMET WHICH COVERS EACH EDGE OF COMMUNICATING PASSAGES FORMED IN TERMINAL PLATE

BACKGROUND OF THE INVENTION

1. Field of the Invention

The present invention relates to a fuel cell stack having stacked unit fuel cells through which a supply and drainage passage for a coolant (or cooling liquid) is provided, and in particular, those for preventing electric short circuits due to coolant in the cells.

2. Description of the Related Art

Typically, solid polymer-type fuel cells have a unit fuel cell in which an anode and a cathode are provided on either side of an electrolyte membrane which is a polymer ionic exchange membrane (i.e., cation exchange membrane). Each unit fuel cell is placed between separators for supporting the unit fuel cell, and generally, a specific number of unit fuel cells are stacked to obtain a fuel cell stack.

In this kind of fuel cell stack, a fuel gas supplied to the anode, for example, a hydrogen gas, is ionized to hydrogen ions on catalytic electrodes, and the hydrogen ions are transferred to the cathode via an electrolyte membrane which is humidified to have an appropriate level of humidity. During this process, electrons are generated and flow to an external circuit, providing DC (direct current) electric energy. An oxidizing gas such as oxygen or air is supplied to the cathode, and the hydrogen gas, electrons, and oxygen gas react at the cathode, thereby generating water.

In most cases, the fuel cell stack employs an internal manifold structure so as to supply a reaction gas such as a fuel gas or an oxidizing gas and a coolant for cooling the fuel cell stack to the anode and cathodes of each of the stacked unit fuel cells. Specifically, this manifold structure has a plurality of communicating holes formed through all of the stacked unit fuel cells and separators. When a reaction gas is supplied to the relevant communicating hole, the reaction gas is distributed and supplied to the unit fuel cells, and simultaneously, the used reaction gas is exhausted to the communicating hole provided for exhausting the reaction gas. Similarly, a coolant is supplied through a communicating hole, and the supplied coolant is used for heat exchange and then drained through a communicating hole provided for draining the coolant. Japanese Unexamined Patent Application, First Publication No. Hei 9-63627 discloses an example of such a system.

In the above-explained fuel cell stack, a high voltage is secured by connecting the stacked unit fuel cells in series. Therefore, generally, a power output terminal plate made of a metal having a high conductivity is attached to an end portion of the fuel cell stack in the stacking direction. In the case of employing the above-explained internal manifold structure, communicating holes for the reaction gas and communicating holes for the coolant should be provided in the power output terminal plate, as formed in the above-described unit fuel cell and separator.

However, a power output terminal plate made of metal may corrode because the vicinity of each communicating hole for coolant is exposed to the coolant. Additionally, as metal having a high conductivity, such as Cu, is used, an electric short circuit via the coolant (i.e., cooling liquid) may occur. In order to solve this problem, pure water, which is an effective insulator, may be used. However, in this case, freezing may occur in cold areas. Furthermore, communicating holes provided for the reaction gas may also corrode due to the water content included in the reaction gas.

In addition, a power output terminal plate made of stainless steel, which has a high resistance to corrosion, may increase power loss because such a plate has a high electric resistance.

SUMMARY OF THE INVENTION

In consideration of the above circumstances, an object of the present invention is to provide a fuel cell stack so as to prevent: (i) the corrosion of the power output terminal plate due to a coolant or the like, and (ii) the occurrence of electric short circuits through the coolant, and to improve the flexibility of selection of the coolant.

Therefore, the present invention provides a fuel cell stack comprising:

a plurality of unit fuel cells (e.g., unit fuel cells 2 in an embodiment explained below), each comprising an anode (e.g., an anode 7 in the embodiment), a cathode (e.g., a cathode 6 in the embodiment), and an electrolyte (e.g., a solid polymer electrolyte membrane 5 in the embodiment) which is placed between the anode and the cathode, wherein the unit fuel cells are stacked via separators (e.g., the first and second separators 3 and 4 in the embodiment); and a pair of power output terminal plates (e.g., terminal plates 26 in the embodiment), one attached to each end face of the stacked unit fuel cells, wherein:

at least one of a coolant supply and drainage passage (e.g., a communicating hole 18 for supplying a coolant or a communicating hole 19 for draining a coolant in the embodiment), and a gas supply and exhaust passage (e.g., a communicating hole 14 for supplying an oxidizing gas, a communicating hole 16 for discharging an oxidizing gas, a communicating hole 15 for supplying a fuel gas, or a communicating hole 17 for discharging a fuel gas in the embodiment) is formed through the stacked unit fuel cells and the power output terminal plates in the stacking direction; and the edge of each passage through the power output terminal plates is covered with a grommet (e.g., a grommet 46 or 50 in the embodiment), having an insulating capability.

According to the above structure, it is possible to prevent the coolant (which passes through the coolant supply and drainage passage) from directly contacting the passage through the power output terminal plates. Therefore, even when the terminal plate is made of a metal having a high conductivity, such as Cu, an increase of the electric resistance due to corrosion and a consequent decrease in the generation efficiency can be avoided. It is also possible to prevent the water content included in the reaction gas (which passes through the gas supply and exhaust passage) from directly contacting the passage through the power output terminal plates. Therefore, similar effects can be obtained. In addition, the grommet is made of a material having an insulating capability; thus, electric short circuits through the coolant can also be avoided.

The grommet may have a portion which contacts an adjacent plate (e.g., the first separator 3, second separator 4, or an insulating plate 27 in the embodiment) of the fuel cell stack, and a seal lip (e.g., a seal lip 49 in the embodiment) may be formed in said portion. Accordingly, the vicinity of each passage (i.e., the coolant supply and drainage passage or the gas supply and exhaust passage) through the adjacent plate can be sealed. Therefore, it is not necessary to provide seal members for sealing the vicinity of the passage, thereby reducing the number of parts and the man-hours required for assembly.

Preferably, the grommet has an engaging portion (e.g., an engaging portion 48 in the embodiment) which is detachably engaged with an engaging portion (e.g., an engaging portion 47 in the embodiment) formed at said edge of each passage through the power output terminal plates. Accordingly, the grommet can be attached to the edge of the relevant passage only by engaging the engaging portion of the grommet with the engaging portion formed in the edge of the passage. Therefore, the attachment of the grommet can be accurately performed by a single action, and the grommet can be easily detached when exchanging parts.

Typically, each grommet attached to one of the power output terminal plates has no hole and is closed.

DESCRIPTION OF THE PREFERRED EMBODIMENTS

Hereinafter, an embodiment according to the present invention will be explained in detail with reference to the drawings.

Figure 1:
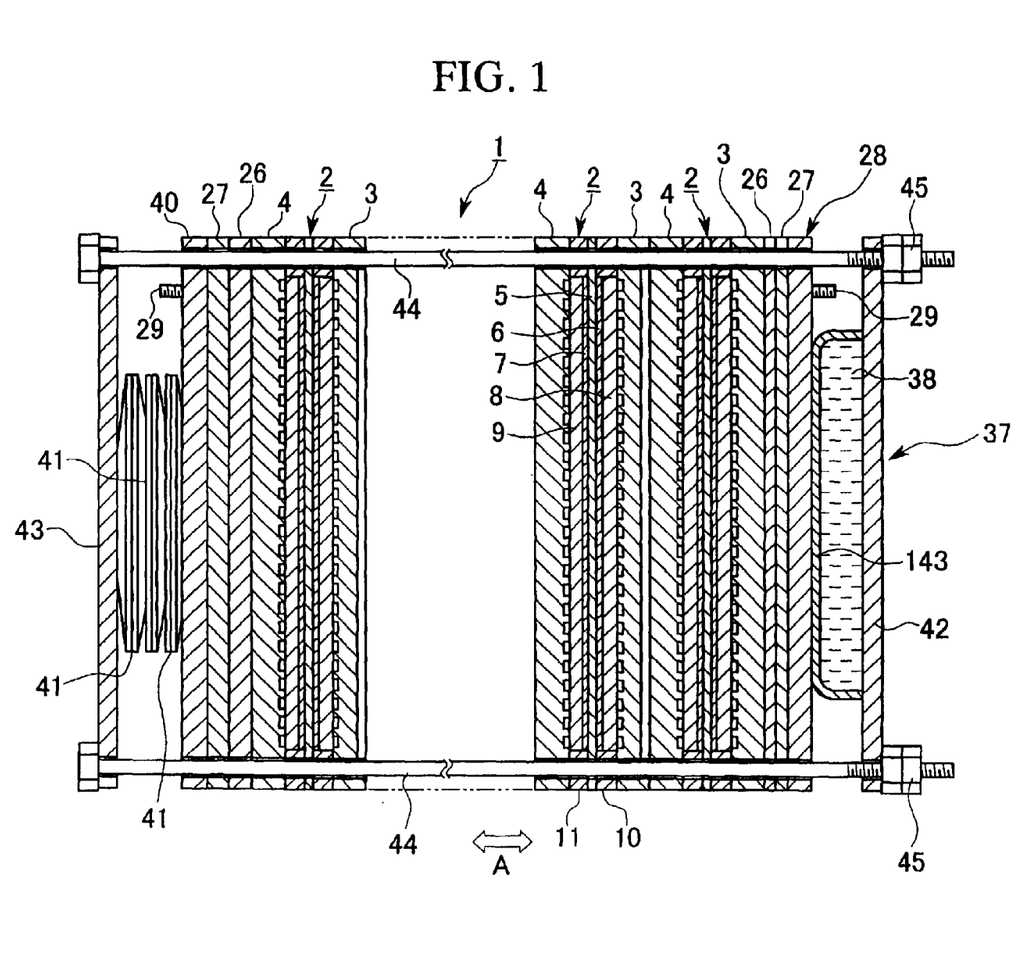
FIG. 1 is a cross-sectional view showing the general structure of an embodiment of the fuel cell stack according to the present invention.
Figure 2:
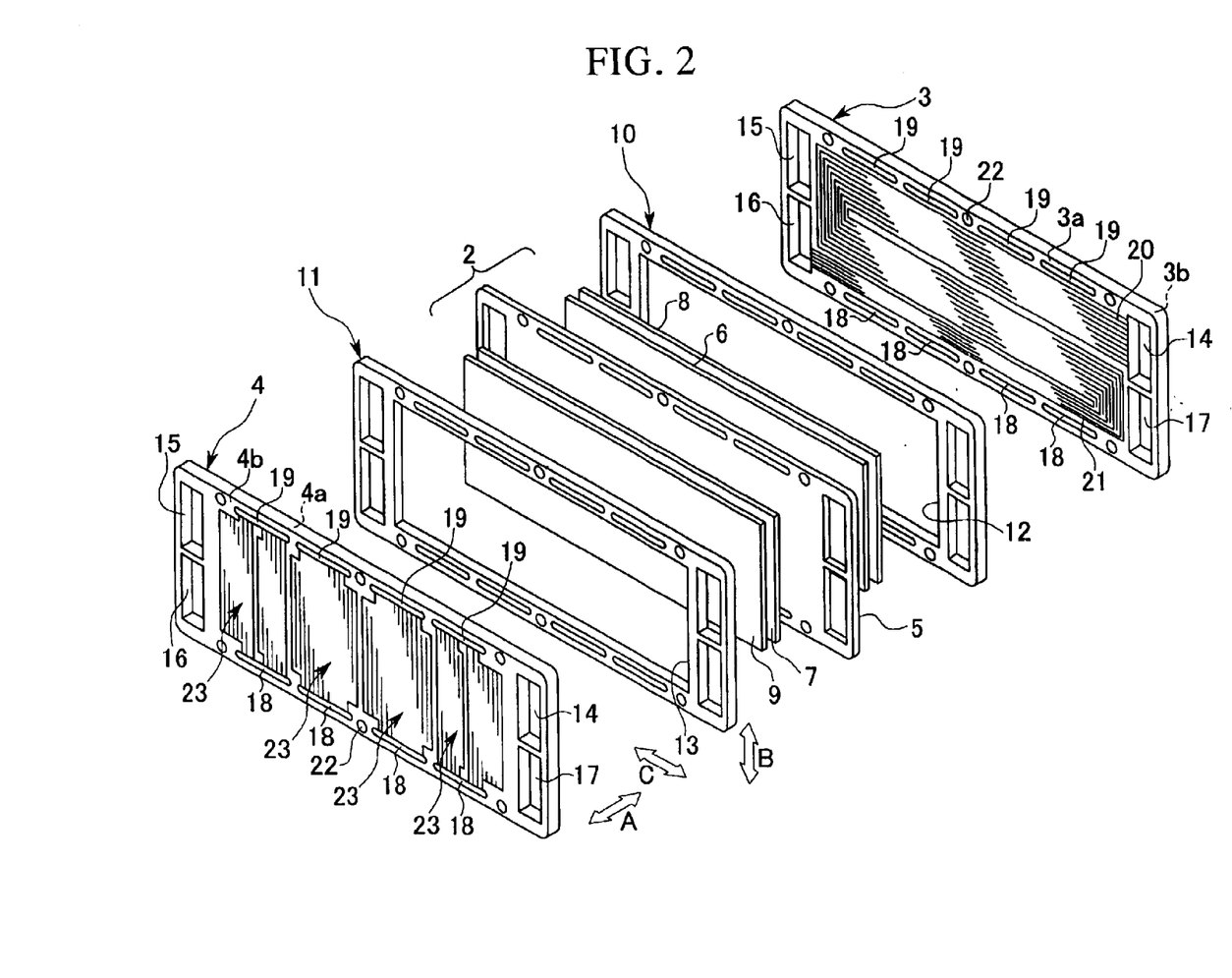
FIG. 2 is a perspective view showing an exploded view of the principal part in FIG. 1.

FIG. 1 is a cross-sectional view showing the general structure of an embodiment of the fuel cell stack according to the present invention. FIG. 2 is a perspective view showing an exploded view of a unit fuel cell with first and second separators.

As shown in FIGS. 1 and 2, the fuel cell stack 1 has a unit structure which consists of a unit fuel cell 2 and first and second separators 3 and 4 for supporting the unit fuel cell 2 (which is placed between separators 3 and 4), and a plurality of the unit structures are stacked along a horizontal direction indicated by arrow A. The shape of the fuel cell stack 1 is a rectangular plate, where the side indicated by arrow B is vertically oriented (i.e., in the direction along which gravity acts), while the side indicated by arrow C (i.e., longer than the side indicated by arrow B) is horizontally oriented.

The unit fuel cell 2 comprises a solid polymer electrolyte membrane 5 (corresponding to the electrolyte of the present invention), a cathode 6, and an anode 7, where the solid polymer electrolyte membrane 5 is placed between the cathode 6 and the anode 7. In addition, first and second gas diffusion layers 8 and 9; each being a porous layer made of a porous carbon paper or the like, are respectively provided for the cathode 6 and the anode 7.

To either side of the unit fuel cell 2, first and second gaskets 10 and 11 are provided. The first gasket 10 has a large opening 12 to contain the cathode 6 and the first gas diffusion layer 8, while the second gasket 11 has a large opening 13 to contain the anode 7 and the second gas diffusion layer 9. That is, the unit fuel cell 2 and the first and second gaskets 10 and 11 are placed between and supported by the first and second separators 3 and 4.

The first separator 3 has a rectangular surface 3a which faces the cathode 6 and the opposite rectangular face 3b, where the longer side is horizontally oriented, while the shorter side is vertically oriented.

In the first separator 3, a communicating hole 14 (corresponding to the gas supply and exhaust passage of the present invention) for supplying an oxidizing gas (here, a gas including oxygen or air), through which the oxidizing gas passes, and a communicating hole 15 (also corresponding to the gas supply and exhaust passage of the present invention) for supplying a fuel gas (e.g., a hydrogen gas), through which the fuel gas passes, are formed. The communicating holes 14 and 15 are respectively provided in an upper end of each shorter side of the fist separator 3 (see FIG. 2), and each communication hole has a rectangular shape having longer sides in the vertical direction.

Also in the first separator 3, a communicating hole 16 (also corresponding to the gas supply and exhaust passage of the present invention) for exhausting the oxidizing gas and a communicating hole 17 (also corresponding to the gas supply and exhaust passage of the present invention) for exhausting the fuel gas are formed. The communicating holes 16 and 17 are respectively provided in a lower end of each shorter side of the first separator 3 (see FIG. 2), and each communication hole has a rectangular shape having longer sides in the vertical direction.

Here, the communicating holes 14 and 16 assigned to the oxidizing gas are diagonally opposite each other, and the communicating holes 15 and 17 assigned to the fuel cell are also diagonally opposite each other.

In addition, four communicating holes 18, 18, . . . (corresponding to the coolant supply and drainage passage of the present invention) for supplying a coolant are provided along the lower long side of the rectangular first separator 3 (see FIG. 2). Each communicating hole 18 has a shape which is elongated in the direction indicated by arrow C. Similarly, four communicating holes 19, 19, . . . (also corresponding to the coolant supply and drainage passage of the present invention) for draining the coolant are provided along the upper long side of the rectangular first separator 3. Each communicating hole 19 has a shape which is elongated in the direction indicated by arrow C. A coolant (i.e., cooling water) such as pure water, ethylene glycol, oil, or the like, is supplied to the communicating holes 18, 18, . . . at the supply side.

In the surface 3a of the first separator 3, a plurality (here, ten) of first oxidizing gas passage grooves 20 are provided. These grooves 20 are isolated from each other and communicate with the communicating hole 14 for supplying the oxidizing gas. In addition, the grooves 20 are horizontally arranged in a squared serpentine pattern (see FIG. 2) leading downwards. The first oxidizing gas passage grooves 20 communicate with five grooves, which are second oxidizing gas passage grooves 21. These second oxidizing gas passage grooves 21 further communicate with the communicating hole 16 for exhausting the oxidizing gas. Furthermore, six holes 22 through which tie rods (explained below) pass, are provided in the first separator 3.

Similar to the first separator 3, the second separator 4 has a rectangular shape, and the second separator 4 has the communicating hole 14 for supplying the oxidizing gas and the communicating hole 15 for supplying the fuel gas. The communicating holes 14 and 15 are through holes provided in the upper ends of the shorter sides of the second separator 4 (see FIG. 2).

The second separator 4 also has the communicating hole 16 for exhausting the oxidizing gas and the communicating hole 17 for exhausting the fuel gas. The communicating holes 16 and 17 are through holes provided in the lower ends of the shorter sides of the second separator 4 (see FIG. 2).

Here, the communicating holes 14 and 16 for the oxidizing gas are diagonally opposite each other, and the communicating holes 15 and 17 assigned to the fuel cell are also diagonally opposite each other.

In addition, four communicating holes 18, 18, . . . for supplying the coolant are provided along the lower long side of the rectangular second separator 4. Each communicating hole 18 is a through hole and has a shape which is elongated in the direction indicated by arrow C. Similarly, four communicating holes 19, 19, . . . for draining the coolant are provided along the upper long side of the rectangular second separator 4. Each communicating hole 19 is a through hole and has a shape which is elongated in the direction indicated by arrow C.

Figure 3:
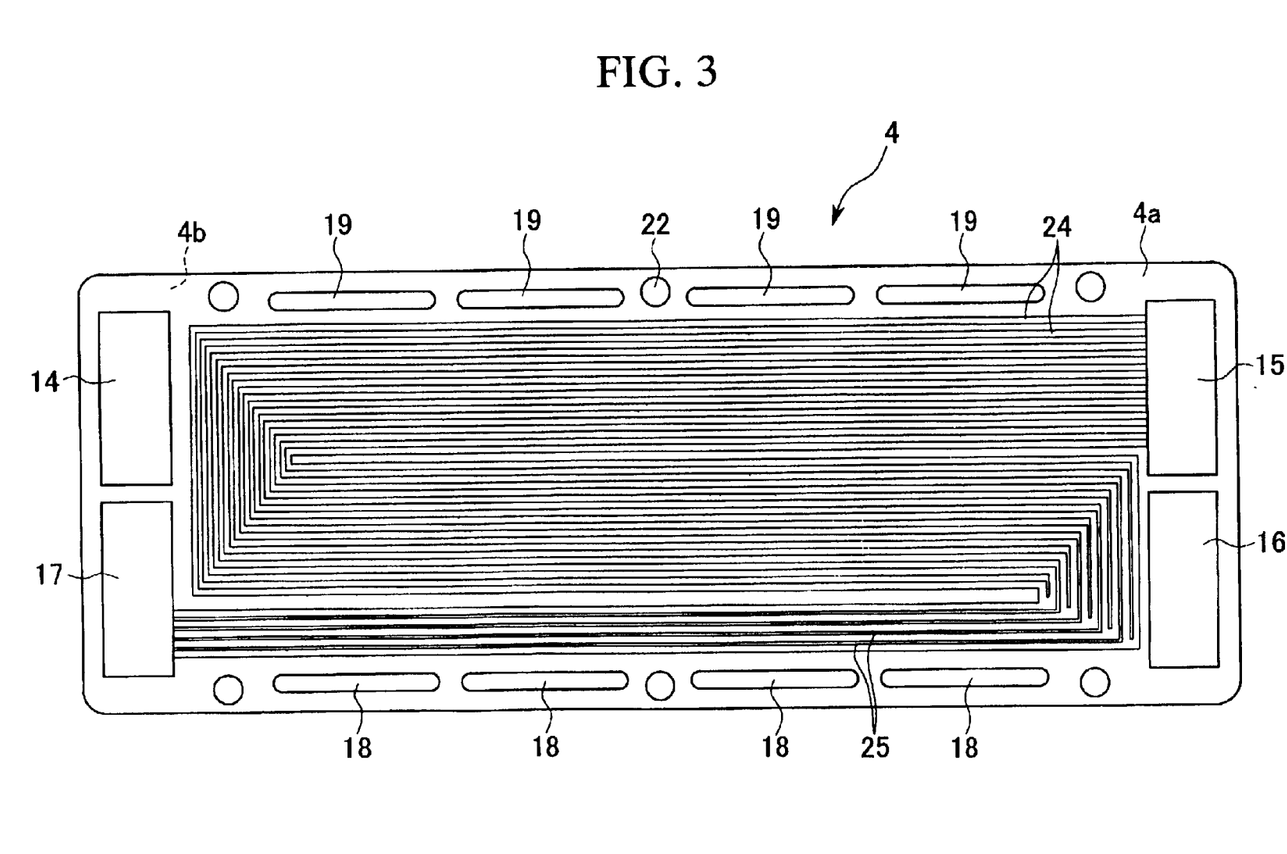
FIG. 3 is a plan view of the second separator in the embodiment.

As shown in FIG. 3, in the surface 4a of the second separator 4, a plurality (here, ten) of first fuel gas passage grooves 24 are provided. These grooves 24 communicate with the communicating hole 15 for supplying the fuel gas. The first fuel gas passage grooves 24 also communicate with five grooves, which are second fuel gas passage grooves 25. These second fuel gas passage grooves 25 further communicate with the communicating hole 17 for exhausting the fuel gas.

As shown in FIG. 2, in the reverse face 4b of the second separator 4, coolant passages 23, 23, . . . are vertically formed, which respectively join the communicating holes 18, 18, . . . for supplying the coolant and the communicating holes 19, 19, . . . for draining the coolant. In addition, in the second separator 4, six holes through which tie rods pass are provided, as provided in the first separator 3.

As shown in FIG. 1, terminal plates 26 for outputting power (corresponding to the power output terminal plates of the present invention) are provided at either end of a predetermined number of stacked unit fuel cells 2 in the direction of stacking. These terminal plates 26 are made of copper, stainless steel, or the like. The first end plate 28 is stacked on one of terminal plates 26 via an insulating plate 27, and the second end 40 is also stacked on the other terminal plate 26 via an insulating plate 27. Additionally, a power output terminal 29 is attached to each terminal plate 26. The power output terminals 29 protrude in opposite directions to each other (see FIG. 1).

Similar to the above-explained separators 3 and 4, in the insulating plate 27 provided for the second end plate 40, the communicating holes 14 to 17, communicating holes 18 and 19, and holes 22 are formed. However, in the insulating plate 27 provided for the first end plate 28, only holes 22 are formed, that is, the communicating holes 14 to 17, and communicating holes 18 and 19 are not provided.

Figure 5:
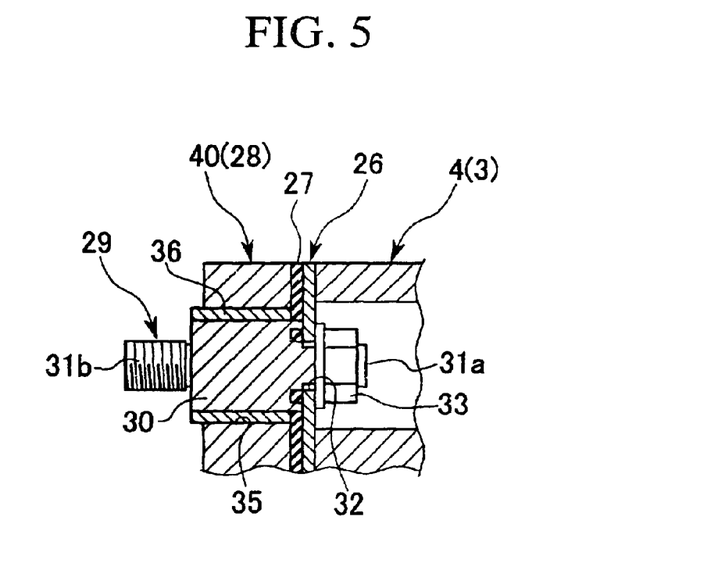
FIG. 5 is a cross-sectional view showing the power output terminal in the embodiment.

FIG. 5 is a cross-sectional view of the region in the vicinity of the power output terminal 29 attached to the second end plate 40. As shown in the figure, the power output terminal 29 has screw portions 31a and 31b at either end of a cylindrical portion 30, where the screw portions 31a and 31b have small diameters while the cylindrical portion 30 has a large diameter. The screw portion 31a passes through a hole 32 which is formed in the terminal plate 26 and protrudes towards a space formed in the second separator 4. A nut 33 is engaged with the screw portion 31a. The insulating plate 27 is attached to the large-diameter portion 30 so as to contact the end plate 26 and improve the sealing capability between the second separator 4 and the second end plate 40, and an insulating ring 36 is inserted between the outer-peripheral face of the large-diameter portion 30 and a hole 35 formed in the second end plate 40. The side where the first end plate 28 is provided has a similar structure.

Figure 4:
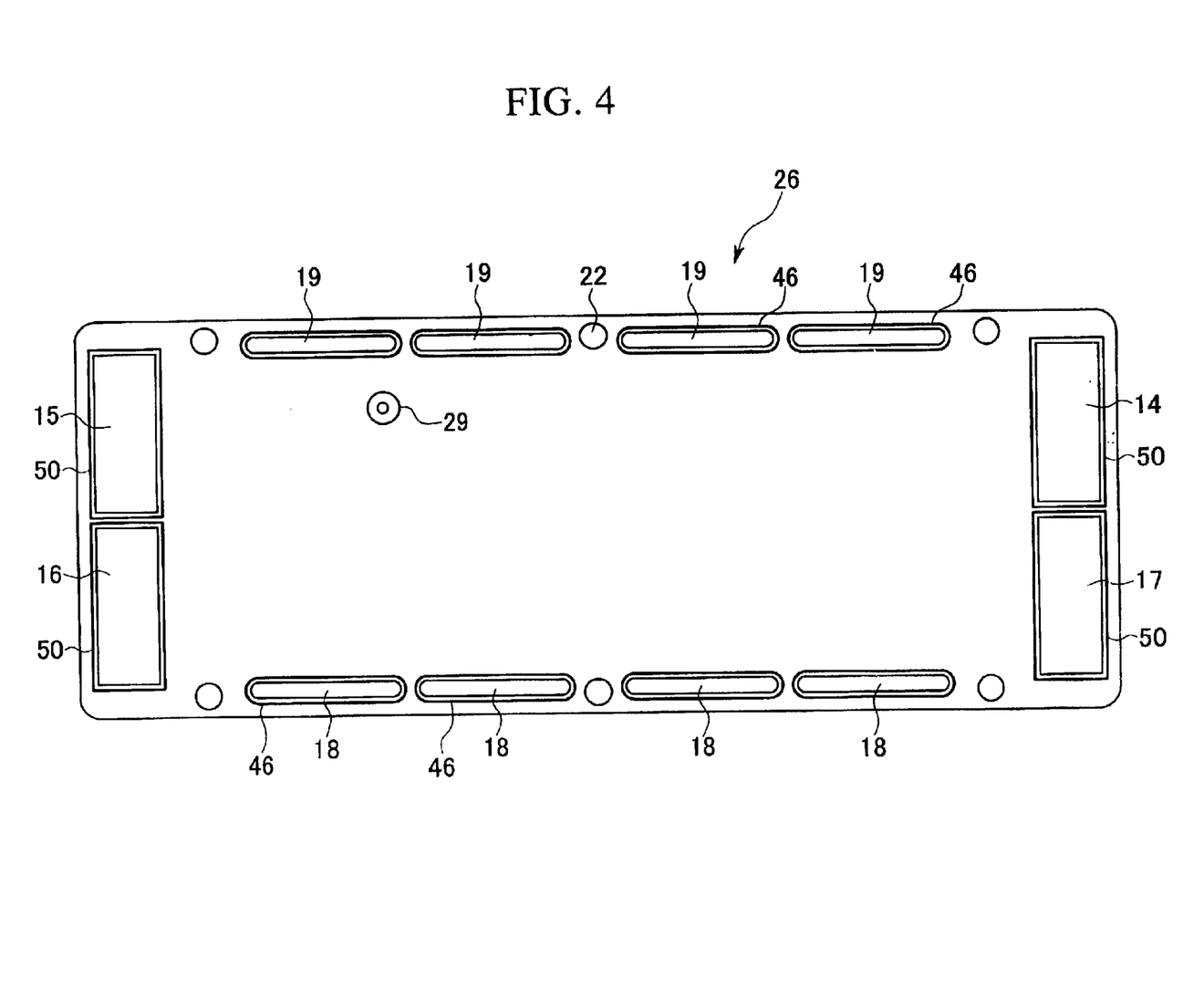
FIG. 4 is a plan view of the terminal plate in the embodiment.

As shown in FIG. 4, the terminal plate 26 provided for the second end plate 40 has a shape almost the same as that of the second separator 4, that is, a rectangular shape. Also in this plate, the communicating hole 14 for supplying the oxidizing gas and the communicating hole 16 for exhausting the oxidizing gas are diagonally opposite each other, and the communicating hole 15 for supplying the fuel gas and the communicating hole 17 for exhausting the fuel gas are also diagonally opposite each other.

In addition, four communicating holes 18, 18, . . . for supplying the coolant are provided along the lower long side of the terminal plate 26, and four communicating holes 19, 19, . . . for draining the coolant are provided along the upper long side of the terminal plate 26. Also in the terminal plate 26, six holes 22 through which tie rods pass are formed. In addition, the power output terminal 29 is attached to each terminal plate 26. The terminal plate 26 provided for the first end plate 28 has a structure similar to the structure of the terminal plate 26 provided for the second end plate 40, except that attached power output terminal 29 of each is oriented in the opposite directions, as explained above. Therefore, a detailed explanation of the terminal plate 26 provided for the first end plate 28 will be omitted here.

As shown in FIG. 1, the fuel cell stack 1 is fastened together in the stacking direction (indicated by arrow A) via a fastening mechanism 37. The fastening mechanism 37 comprises (i) a liquid chamber 38 provided at the outer-face side of the first end plate 28, (ii) an incompressible liquid with which the liquid chamber 38 is filled and which provides a surface pressure, such as silicone oil, and (iii) three disc springs 41, 41, . . . provided at the outer-face side of the second end plate 40 so as to press the second end plate 40 towards the side where the first end plate 28 is provided. These disc springs 41, 41, . . . are positioned at specific intervals in the horizontal direction.

In addition, a back-up plate 42 is provided so that the liquid chamber 38 is placed between the back-up plate 42 and the first end plate 28. More specifically, the liquid chamber 38 is located between the back-up plate 42 and a thin plate 143 made of aluminium or stainless steel. The disc springs 41, 41, . . . are arranged within an area corresponding to the faces of the second end plate 40 and placed at specific intervals (i.e., separated from each other with almost equal spacing). These disc springs 41, 41, . . . are supported by an attachment plate 43, and six tie rods 44 are inserted from the attachment plate 43 through the fuel cell stack 1 into the back-up plate 42, so as to integrally form the fuel cell stack 1.

As shown in FIG. 4, grommets 46, made of an electrically insulating material such as rubber, are detachably fit to the edges of the communicating holes 18 for supplying the coolant and the communicating holes 19 for draining the coolant formed in the terminal plate 26. These grommets 46 cover the edges around each of the communicating holes 18 and 19.

In addition, grommets 50 having a structure similar to that of the grommets 46 are fit to the edges of the communicating hole 14 for supplying the oxidizing gas, communicating hole 15 for supplying the fuel gas, communicating hole 16 for exhausting the oxidizing gas, and communicating hole 17 for exhausting the fuel gas. The shape of the grommets 50 differs from that of the grommets 46; however, the grommets 50 and the grommets 46 have the same cross-sectional shape. Therefore, the grommets 46 will be explained as an example of both.

Figure 6:
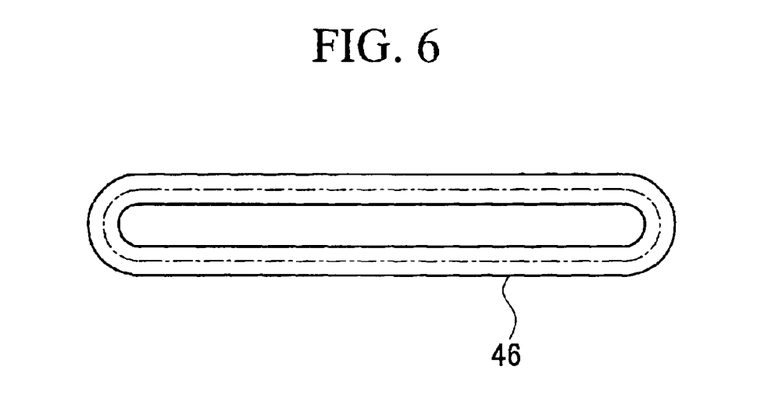
FIG. 6 is a plan view of the grommet in the embodiment.
Figure 7:
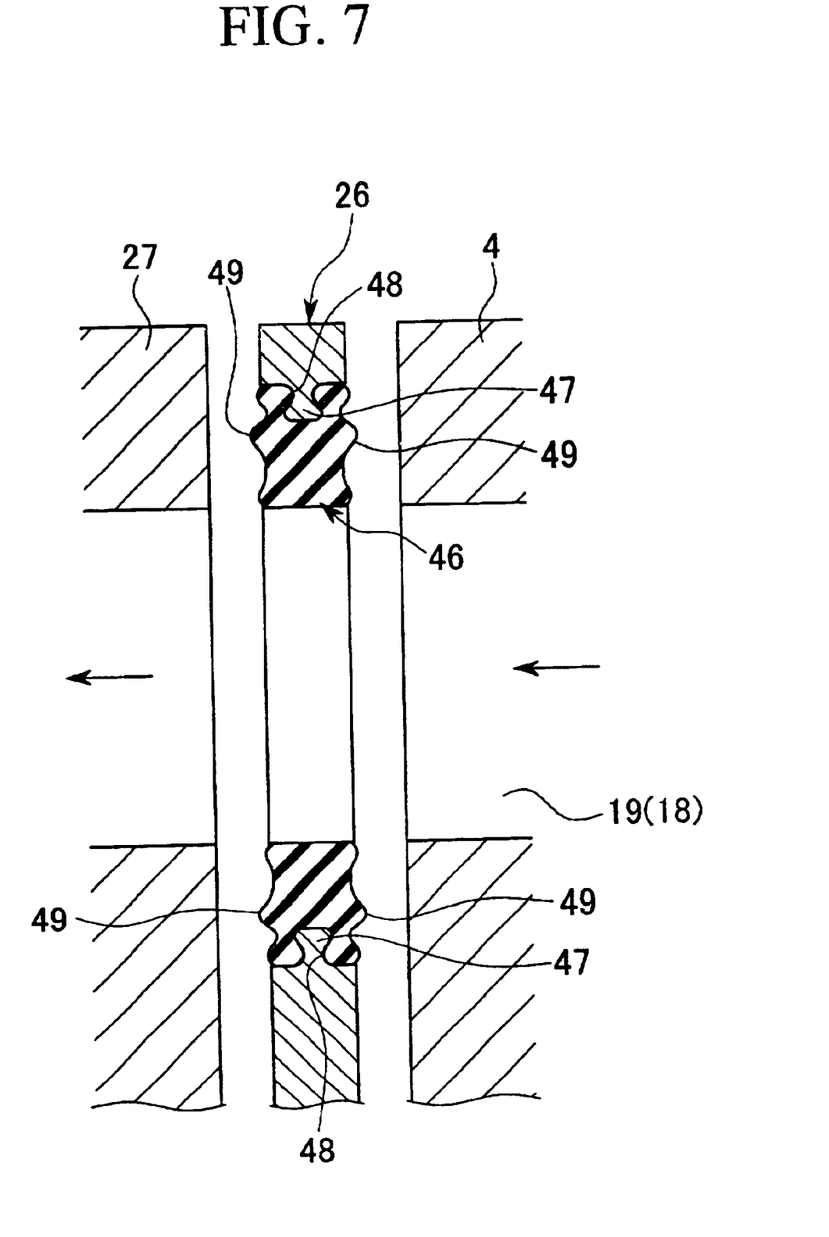
FIG. 7 is a cross-sectional view along line D—D in FIG. 8.
Figure 8:
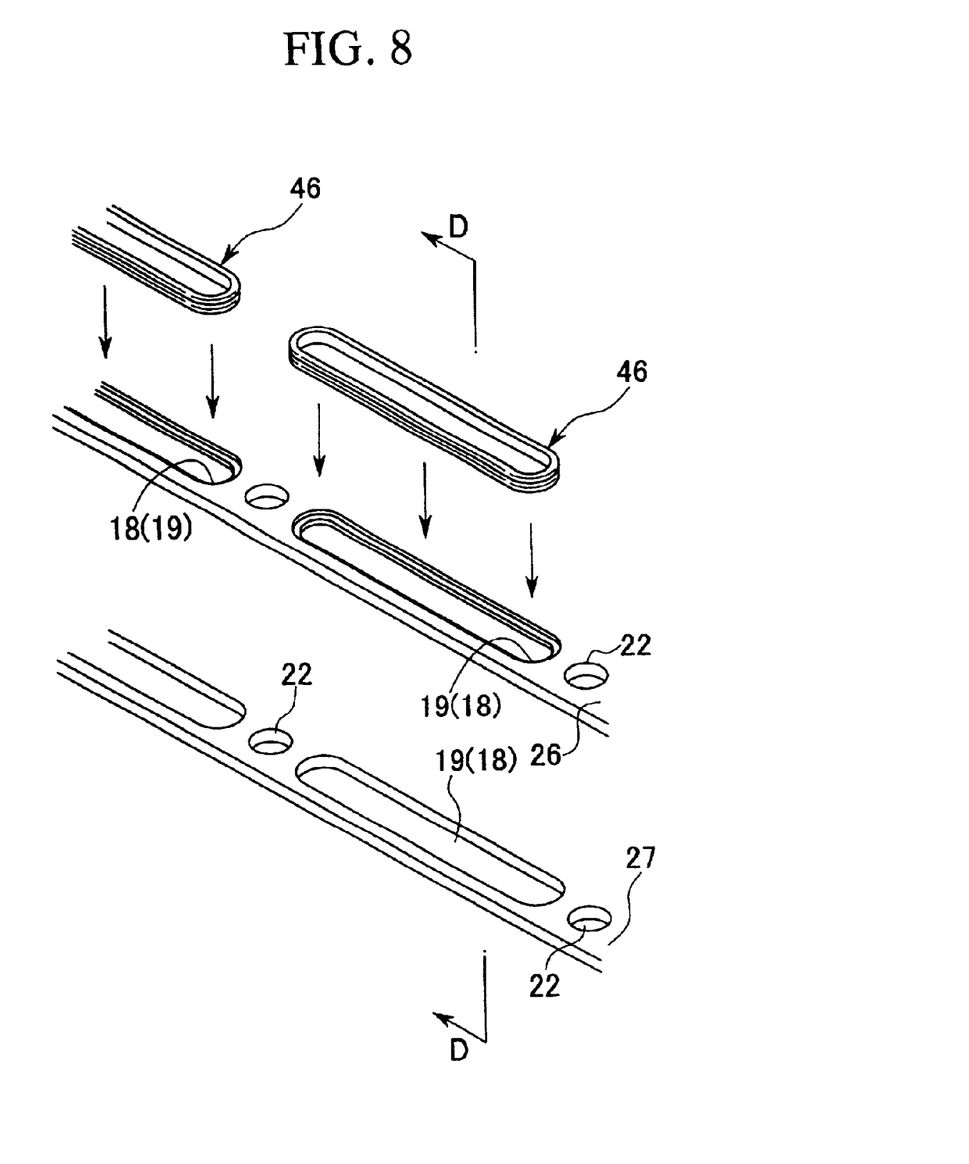
FIG. 8 is a perspective view showing how the grommet is attached in the embodiment.

FIG. 6 is a plan view showing the grommet 46. FIG. 7 is a cross-sectional view of the vicinity of one of the grommets 46 provided at the second end plate 40 side. FIG. 8 is a perspective view of the vicinity of one of the grommets 46 provided at the second end plate 40 side.

As shown in FIGS. 6 to 8, an engagement portion 47 is formed along the entire edge of each of the communicating holes 18 for supplying the coolant and the communicating holes 19 for draining the coolant. The engagement portion 47 have an enlarged head as shown in FIG. 7. In the outer-peripheral portion of the grommet 46, an engagement portion 48 is formed, which can be detachably engaged with the engaging portion 47. Therefore, the grommet 46 is attached to the relevant communicating hole (18 or 19) by engaging the engaging portion 48 with the engaging portion 47. In addition, the thickness of the grommet 46 is almost the same as that of the terminal plate 26. In the grommet 46, the portion which contacts the adjacent plate includes a seal lip 49. In FIG. 7, the adjacent plates are the insulating plate 27 and the second separator 4.

The grommet 46 is formed in a manner such that the length of the inner-peripheral edge of the grommet 46 is the same as the length of the edge of each of the communicating holes 18 and 19 of the adjacent plate. On one of the terminal plates 26, here, one provided at the side including the first end plate 28, grommets (not shown) corresponding the above-explained grommets 26 are provided, where these grommets have no holes and thus are closed.

In the present fuel cell stack having the above-explained structure, a fuel gas (e.g., a gas including hydrogen, obtained by reforming a hydrocarbon) is supplied from the communicating hole 15 of the second end plate 40, and an oxidizing gas such as air (or a gas including oxygen) is supplied from the communicating hole 14 of the second end plate 40. In addition, a coolant (i.e., cooling liquid) is supplied from the communicating holes 18 of the second end plate 40.

The fuel gas is supplied to the first fuel gas passage grooves 24 (see FIG. 4) of each second separator 4. This supplied fuel gas moves in the squared serpentine pattern leading downwards, along the surface 4a of the second separator 4.

In this process, the hydrogen gas included in the fuel gas is supplied through the second gas diffusion layer 9 to the anode 7 of the relevant unit fuel cell 2. That is, the fuel gas is supplied to the anode 7 while the fuel gas moves along the first fuel gas passage grooves 24, and the fuel gas is then exhausted via the second fuel gas passage grooves 25 from the communicating hole 17 of the second end plate 40.

On the other hand, air supplied to the communicating hole 14 for supplying the oxidizing gas is introduced into the first oxidizing gas passage grooves 20 formed on the surface 3a of the first separator 3 (see FIG. 1). The introduced air moves in the squared serpentine pattern leading downwards, along the first oxidizing gas passage grooves 20.

In this process, the oxygen gas in the air is supplied from the first oxidizing gas diffusion layer 8 to the cathode 6, and then the remaining (i.e., non-used) air is exhausted via the second oxidizing gas passage grooves 21 from the communicating hole 16 for exhausting the oxidizing gas. This exhausted air is further exhausted from the communicating hole 16 provided in the second end plate 40.

Accordingly, power generation is performed in the fuel cell stack 1, and the generated power is supplied to a load connected between the power output terminals 29, such as a motor (not shown) or the like.

The inside of the fuel cell stack 1 is efficiently cooled by the coolant. That is, the coolant is introduced into each communicating hole 18 of the second end plate 40 and transferred to the coolant passages 23 of the separator 4. The coolant moves upward along the coolant passages 23. During this movement, the coolant cools the relevant unit fuel cell 2, and the coolant is then drained through and from the communicating holes 19 of the second end plate 40.

As shown in FIGS. 6 to 8, in the terminal plate 26, the edges of the communicating holes 18 for supplying the coolant and communicating holes 19 for draining the coolant are covered with insulating grommets 46. Therefore, it is possible to prevent the coolant from directly contacting these communicating holes 18 and 19. Accordingly, even when the terminal plate 26 is made of a metal having a high conductivity, such as Cu, an increase of the electric resistance due to corrosion and a consequent decrease in the generation efficiency can be avoided. Therefore, the flexibility in the selection of the coolant can be improved. In addition, as the grommets are made of an insulating material, no electric short circuit can occur through coolant (i.e., cooling liquid). Similarly, owing to the grommets 50 attached to the communicating hole 14 for supplying the oxidizing gas, communicating hole 16 for exhausting the oxidizing gas, communicating hole 15 for supplying the fuel gas, and communicating hole 17 for exhausting the fuel gas, it is possible to prevent the edge of each communicating hole from corroding due to the water content of the oxidizing gas or the fuel gas.

Owing to the grommets 46 and 50, the following effects can be obtained. In the following explanations, the grommets 46 are explained as examples; however, similar effects can be obtained by the grommets 50.

Each seal lip 49 formed at an area which contacts each adjacent plate is effective for sealing. In particular, in the group of plates near the second end plate 40, the area between the edges of the communicating holes 18 (for supplying the coolant) and the area between the edges of the communicating holes 19 (for draining the coolant) can be sealed. Therefore, it is not necessary to provide seal members for sealing the vicinity of each of the communicating holes 18 and 19, thereby reducing the number of parts and the man-hours required for assembly.

In addition, the grommets 46 can be attached to the edges of the communicating holes 18 and 19 only by engaging the engaging portion 48 of each grommet 46 with the engaging portion 47 formed in the edge of the communicating hole 18 or 19. Therefore, the attachment of the grommet 46 can be accurately performed by a single action, and the grommet 46 can be easily detached when exchanging parts.

Furthermore, in comparison with known structures in which a seal member is provided so as to surround each communicating hole (for the coolant 18 or 19) on each face of the relevant plate, the sealing can be completed by the grommet 46, that is, a single large portion. Therefore, the number of parts can be decreased, a sufficient degree of deformation of the seal can be obtained, and the grommet can be easily attached or detached.

In addition, due to the grommets 46 provided for the communicating holes 18 and 19, and to the grommets 50 provided for the communicating holes 14 to 17, the surface pressure between the terminal plate 26 and its adjacent plate can be uniform.

What is claimed is:

1. A fuel cell stack comprising:

a plurality of unit fuel cells, each comprising an anode, a cathode, and an electrolyte which is placed between the anode and the cathode, wherein the unit fuel cells are stacked via separators; and a pair of power output terminal plates, one attached to each end face of a unit comprising the stacked unit fuel cells, wherein:

at least one of a coolant passage or a gas passage is formed through the stacked unit fuel cells and the power output terminal plates in the stacking direction; and an inner periphery of each passage through the power output terminal plates is covered with a grommet having an insulating capability.

2. A fuel cell stack as claimed in claim 1, wherein the grommet has a portion which contacts an adjacent plate of the fuel cell stack, and a seal lip is formed in said portion.

3. A fuel cell stack as claimed in claim 1, wherein the grommet has a first engaging portion which is detachably engaged with a second engaging portion formed at said edge of each passage through the power output terminal plates.

4. A fuel cell stack as claimed in claim 2, wherein the grommet has a first engaging portion which is detachably engaged with a second engaging portion formed at said edge of each passage through the power output terminal plates.

5. A fuel stack as claimed in claim 1, wherein each grommet attached to one of the power output terminal plates has no hole and is closed.

* * * * *